United States Patent [19]

Sakurada et al.

[11] 4,356,990

[45] Nov. 2, 1982

[54] DEVICE FOR VERTICALLY ADJUSTING SEAT

[75] Inventors: Kenichi Sakurada, Yokohama; Ryuichi Nishino, Hachioji, both of Japan

[73] Assignees: Nissan Motor Co., Ltd., Yokohama; Tachikawa Spring Company Limited, Akishima, both of Japan

[21] Appl. No.: 118,737

[22] Filed: Feb. 5, 1980

[30] Foreign Application Priority Data

Feb. 9, 1979 [JP] Japan .............................. 54-16452[U]

[51] Int. Cl.³ .............................................. B60N 1/02
[52] U.S. Cl. .................... 248/396; 297/346; 297/348
[58] Field of Search .............. 248/396, 394, 395, 371, 248/419; 297/348, 346

[56] References Cited

U.S. PATENT DOCUMENTS

| | | | |
|---|---|---|---|
| 2,272,536 | 2/1942 | Votypka | 248/394 |
| 2,921,621 | 1/1960 | Williams et al. | 248/394 |
| 3,089,676 | 5/1963 | Pickels | 248/394 |
| 4,159,095 | 6/1979 | Pallant et al. | 248/396 |
| 4,209,158 | 6/1980 | Pickels | 297/346 |
| 4,247,071 | 1/1981 | Carella et al. | 248/396 |

FOREIGN PATENT DOCUMENTS

| | | | |
|---|---|---|---|
| 551808 | 3/1943 | United Kingdom | 248/396 |
| 1441633 | 7/1976 | United Kingdom | 248/396 |

*Primary Examiner*—James T. McCall
*Attorney, Agent, or Firm*—Silverman, Cass & Singer, Ltd.

[57] ABSTRACT

The rear of a seat cushion is adjusted vertically by a bell crank having a pair of opposed ends and an angled portion therebetween. One end of the bellcrank is pivotally coupled to a support of the seat while the other end is coupled to a rotary holding mechanism. The angled portion is pivotally coupled to a rear side of the seat cushion. The rotary holding mechanism is carried by the seat cushion and rotates and maintains the bell crank at the desired position to adjust the seat cushion rear side. The seat cushion is slightly movable horizontally relative to the support during vertical adjustment of the rear side of the seat cushion.

3 Claims, 12 Drawing Figures

DEVICE FOR VERTICALLY ADJUSTING SEAT

BACKGROUND OF THE INVENTION

1. Field of the Invention

The present invention relates to a device for vertically adjusting a seat of a vehicle.

2. Description of the Prior Art

Heretofore, a device has been used with a seat cushion of a vehicle or the like, which vertically moves the front and rear sides of the seat cushion independently, of one another to enable the adjustment of the inclination and height of the seat cushion at will.

The aforesaid device of the prior art is, however, driven by an electric motor and heavy, and is accordingly, it has been costly.

SUMMARY OF THE INVENTION

The present invention is provided to overcome the aforementioned shortcoming of the prior art. An object of the present invention is to provide a light and inexpensive device for vertically adjusting a seat. The device comprises vertically adjusting mechanisms enabling manual and independent adjustment of the vertical positions of the front and rear sides of the seat.

The device for vertically adjusting a seat according to the present invention comprises a front vertically adjusting mechanism for vertically moving the front side of a seat cushion and a rear vertically adjusting mechanism, said rear vertically adjusting mechanism having a bell crank with one end thereof being pivotally connected to a seat slide or floor and the opposite end thereof being connected to a rotary holding means for turning said bell crank and holding said bell crank at a desired angular position, a bent portion of said bell crank being pivotally connected to a rear portion of the seat cushion. In an embodiment of the present invention, the aforesaid rotary holding means comprises a rod rotatably supported by a seat cushion frame and having an operating knob mounted at one end thereof, a nut meshing male threads formed on the opposite end of said rod, and an arm with said nut secured thereto and having one end thereof connected to the aforesaid opposite end of said bell crank.

BRIEF DESCRIPTION OF THE DRAWING

For a better understanding of the invention, reference is made to the accompanying drawing, in which.

DESCRIPTION OF THE PREFERRED EMBODIMENT

Figure 1:
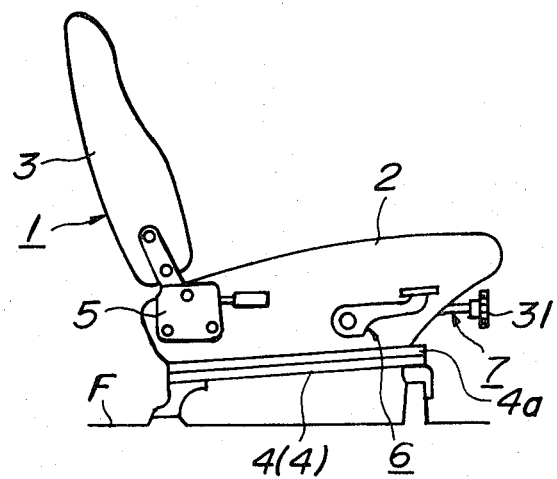
FIG. 1 is a schematic side view of a seat having a device of the invention mounted thereon.
Figure 2:
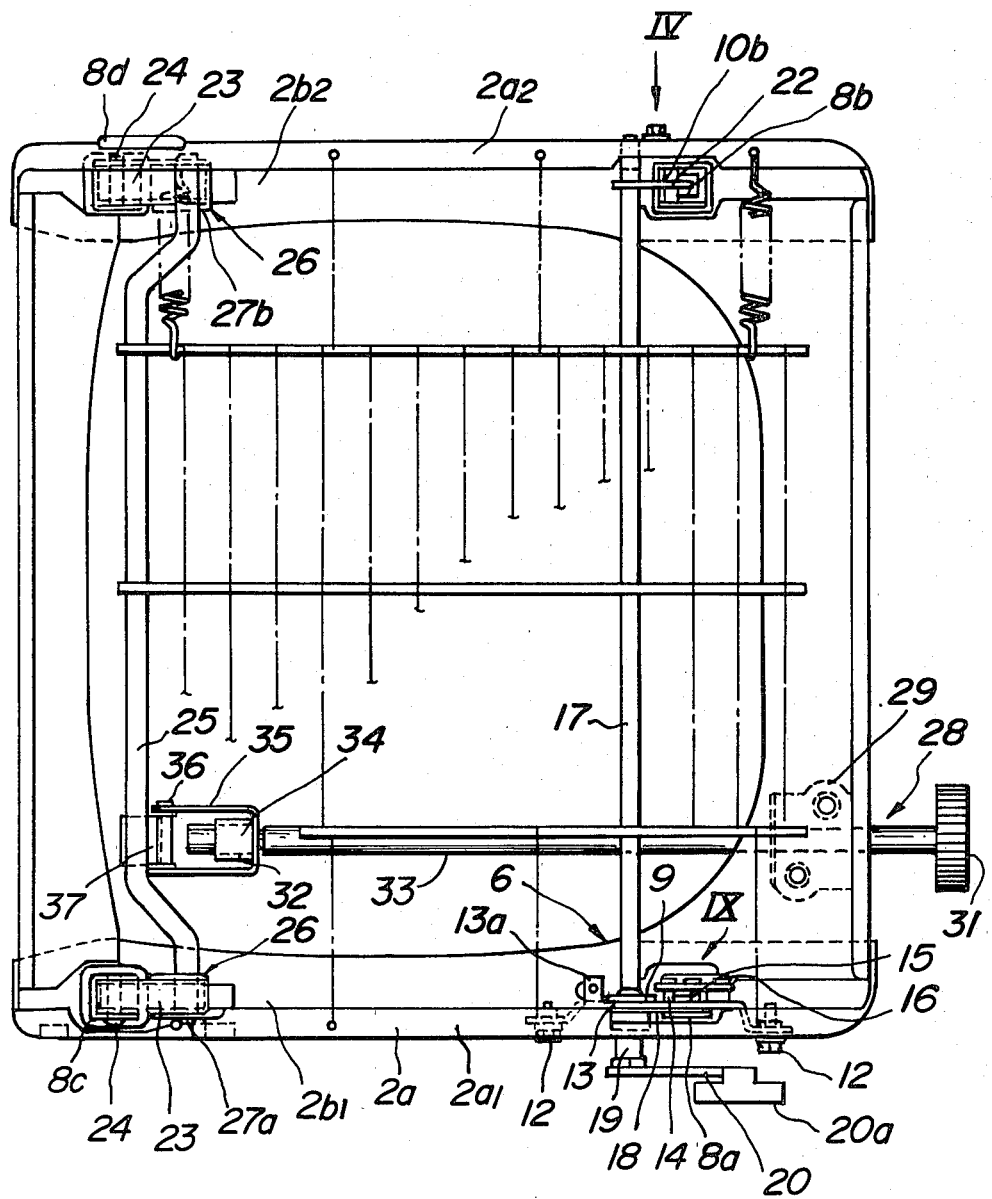
FIG. 2 is a plan view of an embodiment of the device for vertically adjusting a seat according to the present invention.

Referring to FIGS. 1 and 2, reference character 1 indicates a seat comprising a seat cushion 2 and a seat back 3. Reference characters 4, 4 indicate seat slides for moving the seat 1 forwardly and backwardly, and reference character 5 indicates a reclining device for turning the seat back 3 to a desired angular position. The aforesaid seat 1 can be vertically moved at the front side and the rear side thereof, independently, by means of a front vertically adjusting mechanism 6 and a rear vertically adjusting mechanism 7.

The front vertically adjusting mechanism 6 will now be described in detail. As can be seen from FIGS. 1 through 6 and FIG. 9, front brackets 8a and 8b are fixed to upper rails 4a, 4a of the seat slides 4, 4, respectively. A fan-shaped sector 9 is rotatably supported by one of the front brackets 8a through a pin 10a at one end thereof. The sector 9 has a free end thereof provided with a plurality of holding notches, for instance, three notches 11a, 11b and 11c.

Figure 3:
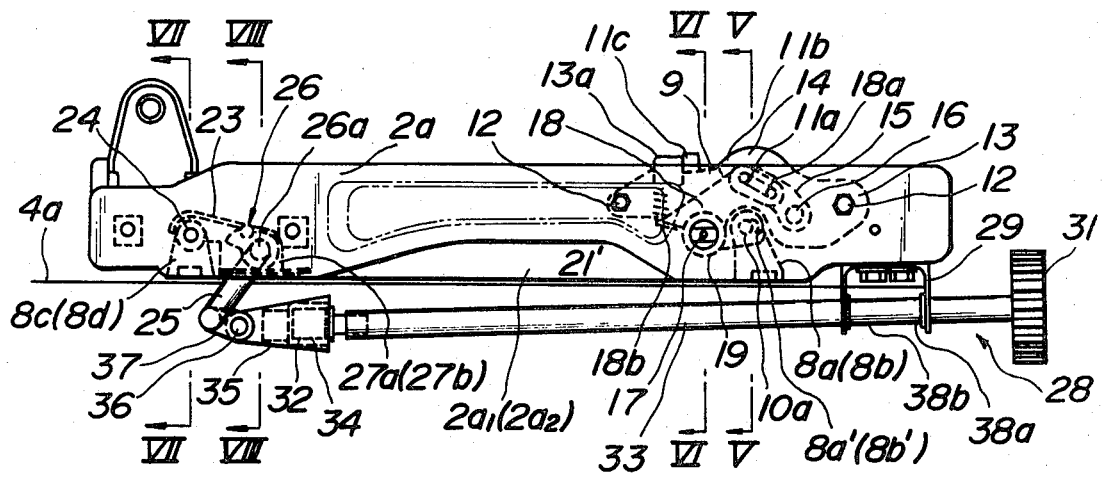
FIG. 3 is a side view of the embodiment of FIG. 2, with a release lever removed therefrom.
Figure 4:
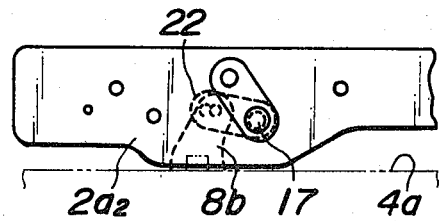
FIG. 4 is a schematic side view taken from the direction of an arrow IV of FIG. 2.
Figure 6:
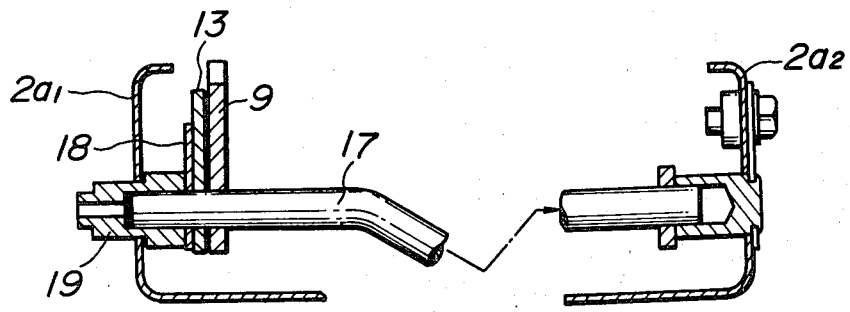
Figure 11:
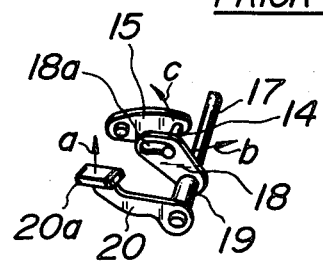
FIGS. 11 and 12 are explanatory diagrams for illustrating the operation of a front and a rear vertically adjusting mechanisms to be incorporated in the device according to the present invention, respectively.

A subassembly bracket 13 is fixed to a sidewall $2a_1$ of one of two cushion frames 2a of the aforesaid seat cushion 2, by means of bolts 12, 12. A base portion of a lock-pin-holding arm 15 is rotatably supported by the subassembly bracket 13 through a pin 16, and a free end of the lock-pin-holding arm 15 has a lock pin 14 which is adapted to selectively engage or to be selectively locked by one of the notches 11a, 11b, and 11c for holding the pin 14. A shaft 17 penetrates through the base portion of the sector 9 at right angles thereto, and the shaft 17 is welded to the base portion of the sector 9 so as to form an integral connection there. As shown in FIG. 6, one end of the shaft 17 extends through the aforesaid subassembly bracket 13 and is journaled at one sidewall $2a_1$ of the seat cushion frame 2a, while the opposite end of the shaft 17 is journaled at the other sidewall $2a_2$. A shifter 18 has a base portion thereof rotatably supported by the shaft 17, which shifter 18 has a bent long hole 18a formed at a free end thereof for receiving the aforesaid lock pin 14 therein, as shown in FIG. 11. A connecting cylinder 19 is loosely fitted on the shaft 17, and one end of the connecting cylinder 19 is integrally connected to one side surface of the base portion of the aforesaid shifter 18, while the opposite end of the connecting cylinder 19 is fixed to the base portion of a release lever 20 having a knob 20a at the opposite end thereof, as can be seen from FIG. 11. Thus, as the release lever 20 is turned, the shifter 18 is also turned accordingly, so that the lock pin 14 engaging the long hole 18a of the shifter 18 is released or shifted from the holding notch 11a (or 11b or 11c), for releasing the locking. Referring to FIG. 3, a return spring 21 is extended between a holding ear piece 18b of the aforesaid shifter 18 and a holding ear piece 13a of the aforesaid subassembly bracket 13, which return spring 21 resiliently urges the aforesaid shifter 18 in a direction for causing the lock pin 14 to engage again with the aforesaid holding notch 11a (or 11b or 11c). Referring to FIGS. 2 and 4, one end of an auxiliary arm 22 is integrally connected to the shaft 17 in the proximity of the sidewall $2a_2$ of the aforesaid cushion frame 2a, while the opposite end of the auxiliary arm 22 is rotatably supported by the front bracket 8b through a pin 10b. The right-hand end of the shaft 17, as seen in FIG.

6 is journaled at the sidewall $2a_2$ of the cushion frame 2a. Support holes 8a' and 8b' are bored on the aforesaid front brackets 8a and 8b, respectively, for supporting the aforesaid pins 10a and 10b, as shown in FIG. 3. The support holes 8a' and 8b' are made as long holes for absorbing horizontal movement of the cushion frame 2a during the vertical adjustment of the rear end of the seat cushion 2. Such absorption of the horizontal movement of the cushion frame 2a may be provided at the sector 9 and the auxiliary arm 22 as well.

The aforesaid front vertically adjusting mechanism 6 is known, and the present invention is not restricted to such mechanism alone.

Figure 10:
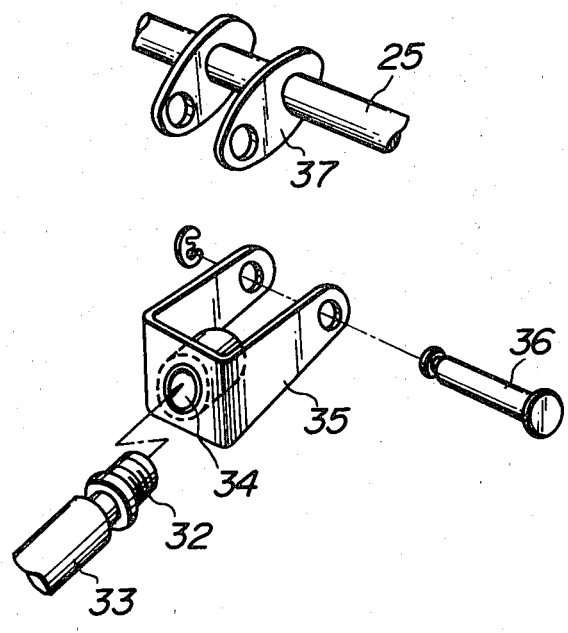
FIG. 10 is an exploded perspective view of a rotary holding means for a bell crank to be used in the present invention.

Then, the aforesaid rear vertically adjusting mechanism 7 according to the present invention is explained in detail. Referring to FIGS. 1 through 3, FIG. 7 and FIG. 8, the rear brackets 8c and 8d are fixed to the aforesaid upper rail 4a, 4a, which brackets 8c and 8d carry pins 24 and 24 for pivotally supporting one end of arms 23 and 23. The opposite ends of the arms 23 and 23 are connected to opposing ends of a crank shaft 25, so that the crank shaft 25 and the arms 23 form a bell crank 26. The opposing end portions of the crank shaft 25, acting as an angled portion 26a of the bell crank 26 (see FIG. 12), are rotatably connected to support brackets 27a and 27b fixed to opposite side horizontal edges $2b_1$ and $2b_2$ of the aforesaid cushion frame 2a. A swaying portion of the crank shaft 25, acting as one end of the bell crank 26 whose opposite end is formed of the aforesaid arms 23, is connected to a rotary holding means 28, which rotary holding means 28 is capable of rotating the bell crank 26 and holding the bell crank 26 at a desired angular position. The rotary holding means 28 comprises a rod 33 supported at two points in a rotatable fashion by a bracket 29 secured to the cushion frame 2a, which rod 33 has a rotary operating knob 31 secured to one end thereof extending outwardly from the front end of the cushion frame 2a, while the opposite end of the rod 33 is provided with a male thread 32; a nut 34 meshing said male tread 32 of the rod 33; a U-shaped arm 35 having the nut 34 secured to a base portion thereof; and auxiliary arms 37 having one end thereof connected to the open end of the U-shaped arm 35 by a connecting pin 36 and the opposite ends thereof being integrally secured to the swaying portion of the aforesaid crank shaft 25 (see FIG. 10). As shown in FIG. 3, the rod 33 is provided with a couple of stopper flanges 38a and 38b for preventing the rod 33 from moving in the longitudinal axial direction thereof.

The rotary holding means 28, however, is not restricted to the aforesaid construction alone. What is required for the rotary holding means 28 is to rotate the bell crank 26 to a desired angular position and to hold the bell crank 26 at the desired angular position. It is also possible to secure the front brackets 8a, 8b and the rear brackets 8c, 8d directly to a floor F (FIG. 1).

Figure 5:
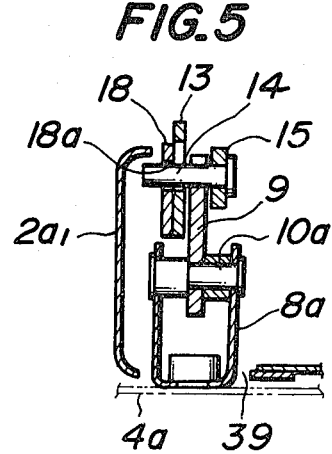
FIGS. 5 through 8 are sectional views taken along the lines V—V, VI—VI, VII—VII, and VIII—VIII of FIG. 3, respectively.
Figure 7:
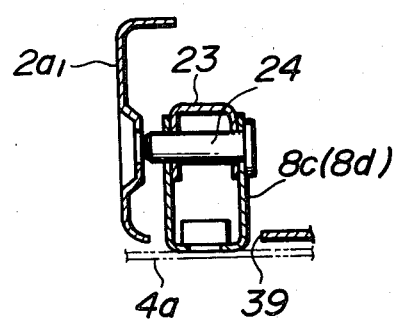
Figure 8:
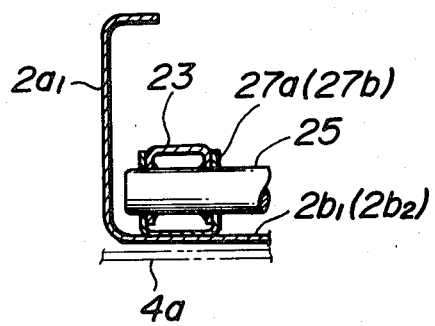
Figure 9:
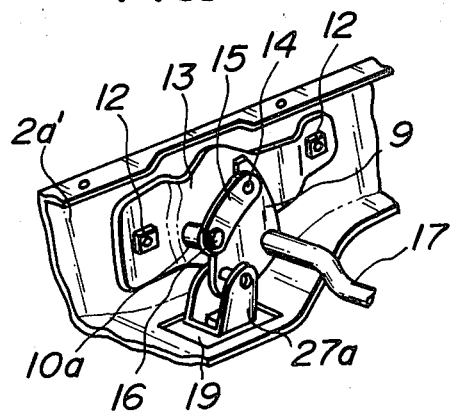
FIG. 9 is a schematic perspective view taken from the direction of an arrow IX of FIG. 2.

In FIG. 5 and FIG. 7, 39 represents holes bored through the cushion frame 2a for allowing the front brackets 8a, 8b and the rear brackets 8c, 8d to be inserted therethrough.

The operation of the device with the aforesaid construction according to the present invention is as follows.

At first, the vertical adjustment of the front side of the cushion 2, which is known, will be explained.

As can be seen from FIG. 11, when the knob 20a of the release lever 20 is raised as shown by the arrow a, the release lever 20 rotates against the elasticity of the spring 21 and the shifter 18, integral with the lever 20 and the connecting cylinder 19 rotates in the direction of the arrow b. As a result thereof, the lock pin 14 engaging the bent long hole 18a of the shifter 18 is shifted in the direction of the arrow c and exits the holding notch of the sector 9, e.g., the notch 11a (or 11b or 11c), for releasing the holding action of the sector 9. Accordingly, under this condition, if the seat back 3 is moved forwardly or backwardly, the seat cushion 2 is turned about the crank shaft 25 of the rear vertically adjusting mechanism 7 for moving the front side of the seat cushion upwardly or downwardly. Thus, if the knob 20a of the release lever 20 is freed after adjusting the front side of the seat cushion 2 to a desired height, the return spring 21 acts to turn the shifter 18 in a reverse direction and causes the lock pin 14 to engage the corresponding holding notch of the sector 9, for instance the notch 11b (or 11a or 11c), whereby the sector 9 is locked and the seat cushion 2 is also locked at the desired angular position.

Hereinafter, the operation of the device of the present invention, namely the vertical adjustment of the rear side of the seat cushion 2, will be explained in detail.

Figure 12:
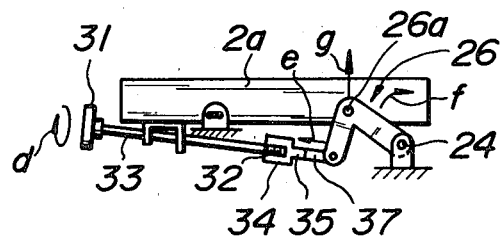

As can be seen from FIG. 12, if the operating knob 31 is turned in a clockwise direction (the direction of the arrow d), the rod 33 is rotated in the same direction, and the nut 34 meshing the male thread 32 of the rod 33 is pulled toward the operating knob 31, and the arm 35 integral with the nut 34 moves in the direction of the arrow e, so that the bell crank 26 is moved by the auxiliary arms 37 about the pins 24 in the direction of the arrow f. As a result, the angled portion 26a of the bell crank 26 moves upwardly, as shown by the arrow g, and the rear side of the cushion frame 2a pivotally connected to the bent portion 26a, i.e., the rear side of the seat cushion 2, is also moved upwardly.

On the other hand, if the knob 31 is turned in a counter-clockwise direction, the entire rear vertically adjusting mechanism 7 operates in the opposite direction to that as described above, so that the rear side of the seat cushion 2 is lowered.

It must be noted here that, when the front and rear sides of the seat cushion 2 are vertically adjusted, the cushion frame 2a slightly moves in a horizontal direction, but such slight horizontal movement is absorbed by the elongated support holes 8a' and 8b', so that smooth operation is not disturbed at all thereby.

As described in the foregoing, with the vertically adjusting device according to the present invention, the rear side of a seat cushion can be vertically adjusted independently of the front side, to a desired height identical with that of the front side or to a desired height giving a desired inclination of the seat cushion 2. Since the present invention enables manual operation for effecting all the aforesaid adjustments, the constituent parts of the device can be made light, and as a result, the entire seat can be made light and provides an outstanding advantage of providing an inexpensive seat.

What is claimed is:

1. A device for vertically adjusting a seat having a seat cushion and a support in the form of a seat slide separate from the cushion, there being front vertically adjusting means for vertically adjusting the front side of said seat cushion, the device comprising:

rear vertically adjusting means including at least one bell crank and rotary holding means, said bell crank including a pair of opposed ends and an angled portion therebetween, one end of the bell crank being pivotally coupled to said support and the other end being coupled to said rotary holding means and the angled portion being pivotally coupled to a rear side of said seat cushion, said rotary holding means being carried by said seat cushion and rotating and holding said bell crank at a desired angular position, said seat cushion being slightly movable horizontally relative to said support during vertical adjustment and the vertical adjustment of the rear side of the seat cushion being effected independantly from the front side of the seat cushion.

2. A device for vertically adjusting a seat having a seat cushion and a support in the form of a seat slide separate from the cushion, the device comprising:

rear vertically adjusting means including at least one bell crank and rotary holding means, said bell crank including a pair of opposed ends and an angled portion therebetween, one end of the bell crank being pivotally coupled to said support and the other end being coupled to said rotary holding means and the angled portion being pivotally coupled to a rear side of said seat cushion, said rotary holding means being carried by said seat cushion and rotating and holding said bell crank at a desired angular position, and said seat cushion being slightly movable horizontally relative to said support during vertical adjustment.

3. A device for vertically adjusting a seat as set forth in claims 1 and 2, wherein said rotary holding means includes a rod rotatably carried by a seat cushion frame of said seat cushion and provided with an operating knob connected to one end thereof, a nut meshing a male thread formed at an opposite end of said rod, and an arm secured to said nut and having one end thereof connected to said opposite end of the bell crank.

* * * * *